(12) United States Patent
Gou

(10) Patent No.: US 11,220,431 B2
(45) Date of Patent: Jan. 11, 2022

(54) STRUVITE AND EXTRACTING METHOD THEREFOR

(71) Applicant: HOWHIGH SCIENCE & TECHNOLOGY (HANGZHOU) CO., LTD., Zhejiang (CN)

(72) Inventor: Jiuzhou Gou, Zhejiang (CN)

(73) Assignee: HOWHIGH SCIENCE & TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 17/270,695

(22) PCT Filed: Nov. 30, 2018

(86) PCT No.: PCT/CN2018/118545
§ 371 (c)(1),
(2) Date: Feb. 23, 2021

(87) PCT Pub. No.: WO2020/037872
PCT Pub. Date: Feb. 27, 2020

(65) Prior Publication Data
US 2021/0246026 A1    Aug. 12, 2021

(30) Foreign Application Priority Data
Aug. 24, 2018   (CN) .......................... 201810973674.8

(51) Int. Cl.
*C01B 25/45*   (2006.01)
*B01D 21/00*   (2006.01)
(Continued)

(52) U.S. Cl.
CPC ........ *C01B 25/451* (2013.01); *B01D 21/0012* (2013.01); *B01D 21/0018* (2013.01);
(Continued)

(58) Field of Classification Search
CPC .................................................. C01B 25/451
See application file for complete search history.

(56) References Cited

U.S. PATENT DOCUMENTS

2014/0076804 A1*   3/2014   Kruk ....................... C02F 1/463
                                                            210/631

FOREIGN PATENT DOCUMENTS

| CN | 1413961 A    | 4/2003 |
|----|--------------|--------|
| CN | 102092871 A  | 6/2011 |

(Continued)

OTHER PUBLICATIONS

Notification to Grant Patent Right for Invention dated Aug. 7, 2019 in corresponding CN Application 201810973674.8, with English translation, 2 pages.

(Continued)

*Primary Examiner* — Peter Keyworth
(74) *Attorney, Agent, or Firm* — Muncy, Geissler, Olds and Lowe, P.C.

(57) ABSTRACT

A struvite and a method for extracting the struvite from seawater, concentrated salt water or brine. $NH_4HCO_3$ and $H_3PO_4$ are added in the seawater, concentrated salt water or brine, and $NH_4HCO_3$, $H_3PO_4$ and the seawater, concentrated salt water or brine are stirred and well mixed to react. Then electromagnetic ionic liquid are dripped, with a dripping time controlled to be 30 to 50 min and pH value of the reaction solution to be within a range of 7.5 to 8.5, to generate white precipitate. Finally, the white precipitate is separated from the liquid, spin dried and packaged to obtain the struvite. The struvite has higher purity and fertilizer efficiency than natural struvite, and also contains potassium, calcium, sulfur and chlorine required for crop growth and (Continued)

dozens of types of trace elements such as molybdenum, zinc, manganese, iron, copper and selenium, which is more suitable for the crop growth.

7 Claims, 1 Drawing Sheet

(51) Int. Cl.

| | | |
|---|---|---|
| *B01D 21/26* | (2006.01) | |
| *B01D 43/00* | (2006.01) | |
| *C02F 1/38* | (2006.01) | |
| *C02F 1/52* | (2006.01) | |
| *C02F 1/66* | (2006.01) | |
| *C05B 7/00* | (2006.01) | |
| *C02F 1/00* | (2006.01) | |
| *C02F 103/08* | (2006.01) | |

(52) U.S. Cl.
CPC ........... *B01D 21/262* (2013.01); *B01D 43/00* (2013.01); *C02F 1/385* (2013.01); *C02F 1/52* (2013.01); *C02F 1/66* (2013.01); *C05B 7/00* (2013.01); *C02F 2001/007* (2013.01); *C02F 2103/08* (2013.01); *C02F 2209/06* (2013.01)

(56) References Cited

FOREIGN PATENT DOCUMENTS

| CN | 102249768 A | 11/2011 |
|---|---|---|
| CN | 102249769 A | 11/2011 |
| CN | 102874784 A | 1/2013 |
| EP | 2904892 A1 | 8/2015 |

OTHER PUBLICATIONS

Second Office Action dated Jun. 12, 2019 in corresponding CN Application 201810973674.8, with English translation, 9 pages.
First Office Action dated Mar. 28, 2019 in corresponding CN Application 201810973674.8, with English translation, 14 pages.
Search Report dated Mar. 21, 2019 in corresponding CN Application 201810973674.8, 2 pages.
International Search Report (PCT/ISA/210) dated May 14, 2019 in corresponding PCT Application PCT/CN2019/118545, with English translation, 5 pages.
Search Report dated Jul. 19, 2019 in corresponding CN Application 201810973674.8, 1 page.

* cited by examiner

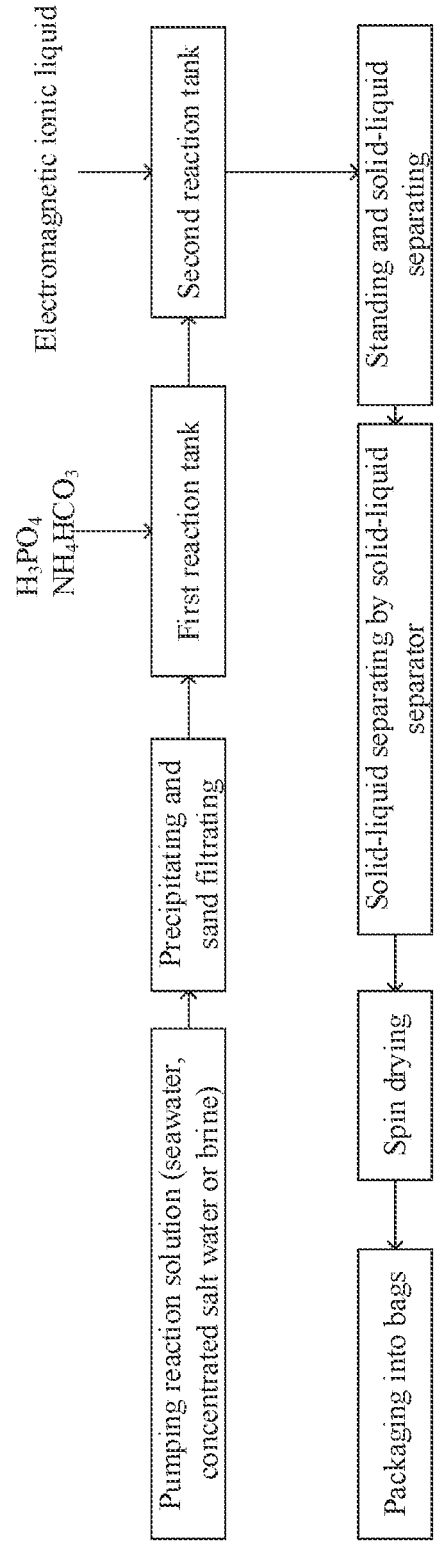

STRUVITE AND EXTRACTING METHOD THEREFOR

TECHNICAL FIELD

The disclosure relates to struvite and a method for extracting the struvite, in particular to a method for extracting the struvite from seawater, salt water or brine.

BACKGROUND ART

Struvite is a type of ore, also known as accumulated birds' or animals' feces. Natural struvite is formed of the accumulated feces and corpses of birds, bats or seals, and can be used as a high-quality fertilizer. A main component of the struvite is Ammonium Magnesium Phosphate Hexahydrate ($MgNH_4PO_4.6H_2O$). The ammonium magnesium phosphate hexahydrate is a white powder with a relative density of 1.711, which is a compound slow-release fertilizer containing nitrogen, phosphorus, magnesium and other elements. The ammonium magnesium phosphate hexahydrate has a low solubility in water, and is slowly decomposed through nitrification with microorganisms under a suitable soil temperature condition to provide nutrients for plants. With characteristics of slow release and difficult leaching of the ammonium magnesium phosphate hexahydrate, the struvite is especially suitable for fertilizing plants growing in sandy soil with magnesium deficiency and ease of nutrient leaching and/or growing in high temperature and rainy regions with magnesium deficiency. In addition, the struvite is especially suitable for fertilizing crops in inland areas around lakes, which presents broad application prospects for reducing lake agricultural non-point source pollution and improving lake eutrophication. China is a large agricultural country with many inland lakes and serious agricultural non-point source pollution, and thus it is undoubtedly of great social and economic value to popularize and apply the struvite.

The natural struvite is a scarce resource, which needs two thousand years to be formed under action of specific natural environment. Currently, the struvite with ammonium magnesium phosphate hexahydrate as its main component can be extracted from wastewater of a sewage treatment plant, of a garbage dump, and of a livestock and poultry farm, or from sludge. However, the struvite extracted with industrial technologies lacks other trace elements required for plant growth.

SUMMARY

To solve the above problems, the present disclosure provides a method for extracting struvite, which includes the following steps:

step A: adding $NH_4HCO_3$ and $H_3PO_4$ into a reaction solution according to $Mg^{2+}$ concentration in the reaction solution, the reaction solution being any one of seawater, salt water or brine and a following reaction occurring:

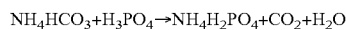

step B: dripping electromagnetic ionic liquid into the reaction solution, with a dripping time controlled to be 30 to 50 min and pH value of the reaction solution to be 7.5 to 8.5, a following reaction occurring and white precipitate being generated:

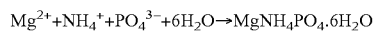

in which the electromagnetic ionic liquid consists of following components in parts by weight:

18.5%-48.1% of ammonia water with a concentration of 10%-26%, 47.9%-77.5% of diluent, 1.6% of EWT electronic water with $-300$ mv$\leq$ORP$\leq-1000$ mv and pH$\geq$13, 2.4% of macromolecular complex, step C: separating the white precipitate in the reaction solution to obtain the struvite.

According to an embodiment of the present disclosure, in the step B, the pH value of the reaction solution is controlled to be 8.0 to 8.5.

According to an embodiment of the present disclosure, in the step B, the diluent is distilled water. The macromolecular complex is selected from one or more of potassium citrate, sodium citrate, potassium silicate, sodium silicate or EDTA.

According to an embodiment of the present disclosure, the following step is further included before the step A:

Step D1: pumping the reaction liquid by a water pump and removing sediment by a sedimentation tank and a sand filtration device.

According to an embodiment of the present disclosure, the reaction solution is stirred by a stirring device in both the step A and the step B.

According to an embodiment of the present disclosure, the step C includes following steps:

step C1: allowing the reaction solution to stand to separate the white precipitate from supernatant of the reaction solution;

step C2: separating the supernatant from white precipitate in the reaction solution through a solid-liquid separator; and step C3: spin-drying the white precipitate by a centrifuge to get water content of the white precipitate less than 8%, so as to obtain the struvite.

According to an embodiment of the present disclosure, in step C3, a centrifuge with 300-500 mesh filter cloth is used to spin-dry the white precipitate.

According to another aspect of the present disclosure, the present disclosure further provides the struvite obtained by the method for extracting the struvite according to any one of the above, with purity of the ammonium magnesium phosphate hexahydrate in the struvite being greater than or equal to 90%.

According to an embodiment of the present disclosure, the struvite also contains C, O, Na, Al, Si, S, Cl, K, Ca, Mn, Fe, Cu, Sr, B, Ba, Zn, Rb, Sc, Se, Th, Sr, Zr, Be, Ta, Tb, Tl, Ag, Hf, Ce and trace elements except for N, P, and Mg.

Compared with the prior art, the technical scheme has the following advantages:

In this disclosure, the electromagnetic ionic liquid with strong permeation, complexing and dispersing capabilities and good oxidation resistance property is prepared with the ammonia water, the diluent, the EWT electronic water and the macromolecular complex in proportion, and the pH value of the reaction liquid can be maintained stable under certain conditions, which facilitates generation of the struvite. A large number of free anions in the electromagnetic ionic liquid adhere to surfaces of precipitate particles, which makes the particles repel each other, and thus with this strong dispersion and anti-precipitation, flocculent precipitates such as $Ca(OH)_2$ and $Ca(H_2PO_4)_2$ can be avoided during the reaction, which facilitates the extraction reaction of the struvite and improves yield of struvite products.

In addition, the free anions in the electromagnetic ionic liquid can form a stable complex with divalent or more polyvalent metal cations in the seawater, salt water or brine, so as to capture elements required for crop growth and various trace elements in the precipitate, so that the prepared struvite contains potassium, calcium, sulfur and chlorine required for the crop growth and dozens of types of trace elements such as molybdenum, zinc, manganese, iron, copper and selenium, in addition to the magnesium ammonium phosphate hexahydrate ($MgNH_4PO_4.6H_2O$). Compared with a traditional method of chemically synthesizing the ammonium magnesium phosphate hexahydrate and a mothed for extracting the struvite from wastewater of a sewage treatment plant, of a garbage dump, and of a livestock and poultry farm, or from sludge and the like, purity and fertilizer effect of the struvite prepared according to this disclosure are higher than those of natural struvite, which is more suitable for the crop growth and convenient for industrial mass production.

BRIEF DESCRIPTION OF THE DRAWINGS

The sole FIGURE is a flow chart of the method for extracting struvite according to the present disclosure.

DETAILED DESCRIPTION

The following description is only intended to disclose the present invention so as to enable those skilled in the art to implement the invention. The embodiments in the following description are by way of example only, and other obvious variations will occur to those skilled in the art. The basic principle of the invention defined in the following description can be applied to other implementations, modified, improved and equivalent schemes and other schemes without departing from the spirit and scope of the utility model.

As shown in the sole figure, the present disclosure provides a method for extracting struvite, especially a method for extracting the struvite from any one of seawater, salt water or brine, and realizes industrial mass production, which has great social and economic value for popularization and application of the struvite. The method for extracting the struvite includes the following steps:

step A: adding $NH_4HCO_3$ and $H_3PO_4$ into a reaction solution according to a $Mg^{2+}$ concentration in the reaction solution, the reaction solution being any one of seawater, salt water or brine and a following reaction occurring:

$NH_4HCO_3+H_3PO_4 \rightarrow NH_4H_2PO_4+CO_2+H_2O$ step B: dripping electromagnetic ionic liquid into the reaction solution, with a dripping time controlled to be 30 to 50 min and pH value of the reaction solution to be 7.5 to 8.5, a following reaction occurring and white precipitate being generated:

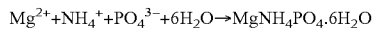
$Mg^{2+}+NH_4^{+}+PO_4^{3-}+6H_2O \rightarrow MgNH_4PO_4.6H_2O$ in which the electromagnetic ionic liquid consists of following components in parts by weight:

18.5%-48.1% of ammonia water with a concentration of 10%-26%, 47.9%-77.5% of diluent, 1.6% of EWT electronic water with $-300 \text{ mv} \leq ORP \leq -1000 \text{ mv}$ and $pH \geq 13$, 2.4% of macromolecular complex, step C: separating the white precipitate in the reaction solution to obtain the struvite.

In the disclosure, any one of the seawater, salt water or brine is adopted as a reaction solution for extracting the struvite. The salt water includes but is not limited to waste water after salt production and salt water after seawater desalination. Brine includes but is not limited to underground brine and waste brine after bromine production. The seawater, salt water or brine contain a large number of divalent and more polyvalent metal ions, such as $Mg^{2+}$, $Ca^{2+}$, etc. $Mg^{2+}$ can server as a source of Mg element in the extracted struvite, and elements such as $K^+$, $Ca^{2+}$, $S^{2-}$, $Cl^-$ are also elements required for plant growth, which can be captured and provided to plants by the method for extracting the struvite according to the disclosure. For ease of explanation, in this embodiment, the principle of the present disclosure is illustrated by taking the seawater as the reaction solution to extract the struvite from the seawater as an example.

In practice, the method for extracting the struvite further includes the following step:

step D: pumping the reaction liquid by a water pump and removing sediment by a sedimentation tank and a sand filtration device. The step D precedes the step A. Specifically, in step D, the seawater is placed in a sedimentation tank for standing to remove coarse sediment, and then passed through a sand filtration device to remove impurities and fine sediment in seawater.

In the step A, the seawater after sand filtration is transferred to a first reaction tank, and a stirring device is started to stir the seawater in the first reaction tank. Dosages of $NH_4HCO_3$ and $H_3PO_4$ needed for a chemical reaction: $NH_4HCO_3+H_3PO_4 \rightarrow NH_4H_2PO_4+CO_2+H_2O$ is calculated according to $Mg^{2+}$ concentration in the seawater. For example, in this embodiment, taking 100 m³ seawater of Bohai as an example, contents of $Mg^{2+}$ and $Ca^{2+}$ in the seawater are 1080 ppm and 350 ppm, respectively, so it is necessary to add 358 kg of $NH_4HCO_3$ with purity of 96% and 502 kg of $H_3PO_4$ solution with concentration of 85% to the first reaction tank while stirring. $NH_4HCO_3$ reacts with $H_3PO_4$ in the first reaction tank to generate $NH_4HPO_4$, $CO_2$ and $H_2O$.

In the step B, reaction liquid in the first reaction tank is pumped into the second reaction tank by a water pump, and the reaction liquid in the second reaction tank is slowly stirred. While stirring, the electromagnetic ionic liquid is dripped into the reaction solution, with a dripping time controlled to be 30 min to 50 min, for example, the dripping time of the electromagnetic ionic liquid is 30 min or 50 min; and with the pH value of the reaction solution in the second reaction tank controlled to be 7.5 to 8.5, for example, the pH value of the reaction solution being controlled to be 7.5 or 8.5. In this embodiment, a metering pump was used to continuously add 3340 Kg of the electromagnetic ionic liquid into the second reaction tank, with the dripping time controlled to be 40 min and the pH value of the reaction solution controlled to be 8.0 to 8.5. After dripping the electromagnetic ionic liquid, continuously the reaction solution in the second reaction tank is stirred for a period of time, for example, for 30 min, so that the reaction solution fully reacts to generate the white precipitate $MgNH_4PO_4.6H_2O$, that is, the struvite.

The electromagnetic ionic liquid is prepared by directly mixing the ammonia water, the diluent, the Electric-magnetic water treatment (EWT) electronic water and the macromolecular complex in proportion, and there is no chemical reaction after mixing the ammonia water, the diluent, the EWT electronic water and the macromolecular complex.

The EWT electronic water is an aqueous solution obtained through EWT technology. The EWT technology is a new water treatment technology developed after 1970s, which was first successfully developed by NASA. The electronic water treatment technology can be widely used in the water supply treatment of industrial and civil cold and/or hot water circulation systems, and has good scale prevention and scale removal, bacteria and algae removal, corrosion inhibition and prevention property, and enables good energy and water saving. A range of an oxidation-reduction potential (ORP) of the EWT electronic water is −300 mv≤ORP≤−1000 mv, and its pH value is equal to or more than 13. The ORP, as a comprehensive index of medium (including soil, natural water, culture medium, etc.) environmental conditions, represents relative degree of oxidizability or reducibility of the medium, with a unit of mv (millivolt).

Furthermore, the diluent in the electromagnetic ionic liquid is distilled water, and the macromolecular complex is selected from one or more of potassium citrate, sodium citrate, potassium silicate, sodium silicate or ethylenediaminetetraacetic acid (EDTA).

In this embodiment, the macromolecular complex includes sodium silicate, potassium citrate and EDTA, and a concentration of the ammonia water is 26%. Taking 100 g prepared electromagnetic ionic liquid as an example, amount of each component is: 18.5 g of 26% ammonia water, 77.5 g diluent (distilled water), 1.6 g EWT electronic water, 1.4 g sodium silicate, 0.5 g potassium citrate, 0.5 g EDTA, and all the components are mixed and stirred evenly to complete preparation.

In preparing the electromagnetic ionic liquid, a proportion of the ammonia water varies with that of the diluent, and the concentration of the ammonia water changes accordingly. For example, when the weight ratio of the diluent in the electromagnetic ionic liquid is 47.9%, the weight ratio of ammonia water is 48.1% and the concentration of the ammonia water is adjusted to 10% accordingly.

The prepared electromagnetic ionic liquid has strong permeation, complexing and dispersing capabilities and good oxidation resistance property. The electromagnetic ionic liquid has a high pH value and does not participate in the reaction in the reaction liquid for extracting the struvite, so the pH value of the reaction liquid can be maintained stable under certain conditions, which facilitates the generation of the struvite. A large number of free anions adhere to surfaces of precipitate particles, which makes the particles repel each other, and thus with this strong dispersion and anti-precipitation, flocculent precipitates such as $Ca(OH)_2$ and $Ca(H_2PO_4)_2$ can be avoided during the reaction, which facilitates the extraction reaction of the struvite and improves yield of struvite products. In addition, there are a large number of free anions in the electromagnetic ionic liquid, which can form stable complexes with divalent and more polyvalent metal cations in the seawater, so as to capture elements required for the crop growth and various trace elements in the precipitate.

It is worth mentioning that both the first reaction tank and the second reaction tank are provided with stirring devices, and the reaction liquid is stirred by the stirring devices in the step A and the step B. Specifically, in the step A, by stirring the reaction solution, $NH_4HCO_3$, $H_3PO_4$ and the reaction solution can be stirred and well mixed to react. In the step B, a stirring speed affects a particle size of the generated white precipitate, namely $MgNH_4PO_4 \cdot 6H_2O$. In a production process, it is necessary to maintain the pH value of the reaction solution in the second reaction tank by adding the electromagnetic ionic liquid and controlling reaction time to guarantee the desired particle size of the struvite finally to be obtained.

In the step C, the reaction solution is allowed to stand to separate the white precipitate (i.e., $MgNH_4PO_4 \cdot 6H_2O$) from the supernatant of the reaction solution, and white precipitate with a large particle size which sinks at a bottom of the reaction solution can be obtained in this step. Then, the supernatant and white precipitate in the reaction solution are separated from each other by a solid-liquid separator, and in this step the white precipitate suspended in the reaction solution with a smaller particle size can be further obtained. Finally, the white precipitate is spin dried by a centrifuge to get water content of the white precipitate less than 8%. For example, the white precipitate can be spin dried by a centrifuge with 300-500 mesh filter cloth to obtain the struvite. Excess water in the struvite with high water content is removed by spin-drying, and then the struvite is packaged into bags by an automatic packaging machine according to specifications.

In this embodiment, according to the above operation, about 1.3 tons of the struvite can be produced in 100 m³ seawater of Bohai, and the content of the magnesium ammonium phosphate hexahydrate ($MgNH_4PO_4 \cdot 6H_2O$) in the struvite is greater than or equal to 90%, in which content of N is 4.26%, content of $P_2O_5$ is 24.2%, content of Mg is 7.6%, and other elements and trace elements and free water account for 10%.

In addition, in a case where the struvite is extracted from salt water or brine, extracting steps are the same as those of extracting the struvite from the seawater in the above embodiments, only except that it is only necessary to adjust dosage of $NH_4HCO_3$, $H_3PO_4$ and the electromagnetic ionic liquid in proportion according to the $Mg^{2+}$ ion content in the salt water or brine in step A.

According to another aspect of the present disclosure, the present disclosure further provides the struvite obtained by the method for extracting the struvite described above, with purity of the ammonium magnesium phosphate hexahydrate in the struvite being greater than or equal to 90%. Furthermore, the struvite also contains C, O, Na, Al, Si, S, Cl, K, Ca, Mn, Fe, Cu, Sr, B, Ba, Zn, Rb, Sc, Se, Th, Sr, Zr, Be, Ta, Tb, Tl, Ag, Hf, Ce and trace elements except for N, P, and, Mg.

The main elements and trace elements in the struvite prepared by the above method are shown in the following table:

| Serial Number | Element | Content (%) | Remarks |
|---|---|---|---|
| 1 | C | 1.65 | |
| 2 | O | 43.03 | |
| 3 | Na | 3.68 | |
| 4 | Mg | 7.367 | |
| 5 | Al | 0.114 | |
| 6 | Si | 29.56 | |
| 7 | S | 0.722 | |
| 8 | Cl | 12.29 | |
| 9 | K | 0.642 | |
| 10 | Ca | 0.579 | |
| 11 | Ti | 0.011 | |
| 12 | Mn | 0.098 | |
| 13 | Fe | 0.0417 | |
| 14 | Cu | 0.0073 | |
| 15 | Br | 0.102 | |
| 16 | Sr | 0.0125 | |
| 17 | B | 0.0038 | |
| 18 | Mo | <0.001 | |
| 19 | Li | <0.001 | |
| 20 | P | 0.008 | |
| 21 | Ba | 0.0022 | |
| 21 | Se | <0.001 | |
| 22 | Cr | <0.001 | |
| 23 | V | <0.001 | |
| 24 | Zn | 0.0156 | |
| 25 | As | <0.001 | |
| 26 | Yb | <0.0001 | Not detected |
| 27 | W | <0.001 | |

-continued

| Serial Number | Element | Content (%) | Remarks |
|---|---|---|---|
| 28 | Co | <0.001 | |
| 29 | Ga | <0.001 | |
| 30 | Ge | <0.001 | |
| 31 | La | <0.001 | |
| 32 | Pb | <0.001 | |
| 33 | Rb | <0.001 | |
| 34 | Sc | <0.001 | |
| 35 | Se | <0.001 | |
| 36 | Sn | <0.001 | |
| 37 | Th | <0.001 | |
| 38 | Sr | <0.001 | |
| 39 | Zr | <0.001 | |
| 40 | Be | <0.001 | |
| 41 | Ta | <0.001 | |
| 42 | Tb | <0.001 | |
| 43 | Te | <0.001 | |
| 44 | Tl | <0.001 | |
| 45 | Ag | <0.001 | |
| 46 | Hf | <0.001 | |
| 47 | Hg | <0.001 | |
| 48 | In | <0.001 | |
| 49 | Cd | <0.001 | |
| 50 | Ce | <0.001 | |
| | Total | 100.00 | |

Compared with the traditional technology of extracting the struvite from wastewater of a sewage treatment plant, of a garbage dump, and of a livestock and poultry farm, or from sludge and the like, it is more difficult to extract the struvite from any one of the seawater, salt water or brine, because divalent and more polyvalent divalent metal ions in the seawater, salt water or brine are easy to generate flocculent precipitates such as $Ca(OH)_2$ and $Ca(H_2PO_4)_2$ in the reaction process. Therefore, in the disclosure, the electromagnetic ionic liquid with strong permeation, complexing and dispersing capabilities and good oxidation resistance property is innovatively developed and prepared. There are a large number of free anions in the electromagnetic ionic liquid, which can form stable complexes with divalent and more polyvalent metal cations in the seawater. The large number of free anions adhere to surfaces of precipitate particles, which makes the particles repel each other, and thus with this strong dispersion and anti-precipitation, the technical problem of flocculent precipitates such as $Ca(OH)_2$ and $Ca(H_2PO_4)_2$ can be addressed during the reaction. At the same time, requirements of industrial production can be met, and the quality, particle size and yield of the struvite can be guaranteed.

Compared with the traditional method for extracting the struvite, the struvite prepared by the method for extracting the struvite according to the disclosure contains potassium, calcium, sulfur and chlorine required for the crop growth and dozens of types of trace elements such as molybdenum, zinc, manganese, iron, copper and selenium, in addition to the magnesium ammonium phosphate hexahydrate ($MgNH_4PO_4 \cdot 6H_2O$), and purity and fertilizer efficiency of the produced struvite are higher than those of natural struvite, which is more suitable for the crop growth.

It is should be appreciated by those skilled in the art that the above description and the embodiments of the invention shown in the drawings are only by way of example and do not limit the invention. The purpose of the invention has been completely and effectively achieved. The function and structural principle of the invention have been shown and explained in the embodiments; any variation and modification can be made to the embodiments of the invention without departing from the principle.

The invention claimed is:

1. A method for extracting struvite, comprising following steps:

step A: adding $NH_4HCO_3$ and $H_3PO_4$ into a reaction solution according to a $Mg^{2+}$ concentration in the reaction solution, the reaction solution being any one of a seawater, a salt water or a brine, and a following reaction occurring:

$$NH_4HCO_3 + H_3PO_4 \rightarrow NH_4H_2PO_4 + CO_2 + H_2O$$

step B: dripping an electromagnetic ionic liquid into the reaction solution, with a dripping time controlled to be 30 to 50 min and pH value of the reaction solution to be 7.5 to 8.5, a following reaction occurring and a white precipitate being generated:

$$Mg^{2+} + NH_4^+ + PO_4^{3-} + 6H_2O \rightarrow MgNH_4PO_4 \cdot 6H_2O$$

wherein the electromagnetic ionic liquid consists of following components in parts by weight:
18.5%-48.1% of an ammonia water with a concentration of 10%-26%,
47.9%-77.5% of a diluent,
1.6% of an electric-magnetic water treatment (EWT) electronic water with $-300$ mv$\leq$ORP$\leq-1000$ mv and pH$\geq$13, and
2.4% of a macromolecular complex,
step C: separating the white precipitate from the reaction solution to obtain the struvite.

2. The method for extracting the struvite according to claim 1, wherein in the step B, the pH value of the reaction solution is controlled to be 8.0 to 8.5.

3. The method for extracting the struvite according to claim 1, wherein in the step B, the diluent is a distilled water, the macromolecular complex is selected from one or more of a potassium citrate, a sodium citrate, a potassium silicate, a sodium silicate or an ethylenediaminetetraacetic (EDTA).

4. The method for extracting the struvite according to claim 1, further comprising a following step before the step A:

Step D1: pumping the reaction solution by a water pump and removing a sediment by a sedimentation tank and a sand filtration device.

5. The method for extracting the struvite according to claim 1, wherein the reaction solution is stirred by a stirring device in both the step A and the step B.

6. The method for extracting the struvite according to claim 1, wherein the step C comprises following steps:
step C1: allowing the reaction solution to stand to separate the white precipitate from a supernatant of the reaction solution;
step C2: separating the supernatant from the white precipitate in the reaction solution through a solid-liquid separator; and
step C3: spin-drying the white precipitate by a centrifuge to make a water content of the white precipitate less than 8%, and obtaining the struvite.

7. The method for extracting the struvite according to claim 6, wherein in step C3, the centrifuge with 300-500 mesh filter cloth is used to spin-dry the white precipitate.

* * * * *